(12) United States Patent
Fasoli et al.

(10) Patent No.: US 9,129,278 B2
(45) Date of Patent: Sep. 8, 2015

(54) PRE-ALLOCATING MERCHANT ID IN A CREDIT CARD PROCESSOR ENTITY SYSTEM BY A MASTER MERCHANT

(75) Inventors: Jonathan David Fasoli, Aliso Viejo, CA (US); Jugdip Singh Bath, San Ramon, CA (US); Maksim Rokhline, Castro Valley, CA (US); Allyson Lippert Letteri, San Francisco, CA (US); Scott Alan Blum, Malibu, CA (US); Yogish Pai, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 709 days.

(21) Appl. No.: 13/436,711

(22) Filed: Mar. 30, 2012

(65) Prior Publication Data

US 2013/0262307 A1  Oct. 3, 2013

(51) Int. Cl.
    G06Q 20/22  (2012.01)
    G06Q 20/24  (2012.01)
    G06Q 20/34  (2012.01)
    G06Q 30/06  (2012.01)

(52) U.S. Cl.
    CPC ............... *G06Q 20/22* (2013.01); *G06Q 20/24* (2013.01); *G06Q 20/3578* (2013.01); *G06Q 30/06* (2013.01)

(58) Field of Classification Search
    None
    See application file for complete search history.

(56) References Cited

U.S. PATENT DOCUMENTS

| | | | |
|---|---|---|---|
| 6,353,811 B1 | 3/2002 | Weissman | |
| 7,103,570 B1 * | 9/2006 | Morea et al. | 705/38 |
| 7,899,742 B2 * | 3/2011 | Benkert et al. | 705/39 |
| 7,949,545 B1 * | 5/2011 | Madras et al. | 705/3 |
| 8,423,467 B1 * | 4/2013 | Johansson et al. | 705/44 |
| 2003/0163416 A1 * | 8/2003 | Kitajima | 705/39 |
| 2008/0270209 A1 | 10/2008 | Mauseth et al. | |
| 2011/0125645 A1 * | 5/2011 | Benkert et al. | 705/44 |
| 2012/0271692 A1 * | 10/2012 | Huang et al. | 705/14.23 |

FOREIGN PATENT DOCUMENTS

| | | |
|---|---|---|
| KP | 10-2003-0066494 | 8/2003 |
| KR | 10-2003-0023830 | 3/2003 |

OTHER PUBLICATIONS

International Search Report and Written Opinion for PCT/US2013/034827, dated Jul. 23, 2013 (9 pages).
Korean Intellectual Property Office Abstract for Publication No. 10-2003-0023830, published on Mar. 20, 2003 (1 page).
Korean Intellectual Property Office Abstract for Publication No. 10-2003-0066494, published on Aug. 9, 2003 (1 page).

\* cited by examiner

*Primary Examiner* — Calvin L Hewitt, II
*Assistant Examiner* — Isidora Iluonakhamhe
(74) *Attorney, Agent, or Firm* — Osha Liang LLP

(57) ABSTRACT

A method to process credit card transactions, including obtaining available merchant account IDs allocated to a master merchant account at a credit card processor entity of a credit card transaction network, where the master merchant is authorized to set up merchant accounts based on the master merchant account and assumes merchant-side financial risks of the merchant accounts, receiving, after obtaining the available merchant account IDs, a request from a merchant to set up a merchant account, and assigning, in response to credit approval of the merchant, a merchant account ID selected from the available merchant account IDs to the merchant for setting up the merchant account, where a credit card transaction of the merchant is submitted, subsequent to assigning the merchant account ID, to the credit card processor entity for authorization based on the master merchant account, where the credit card transaction is tagged with the merchant account ID.

19 Claims, 6 Drawing Sheets

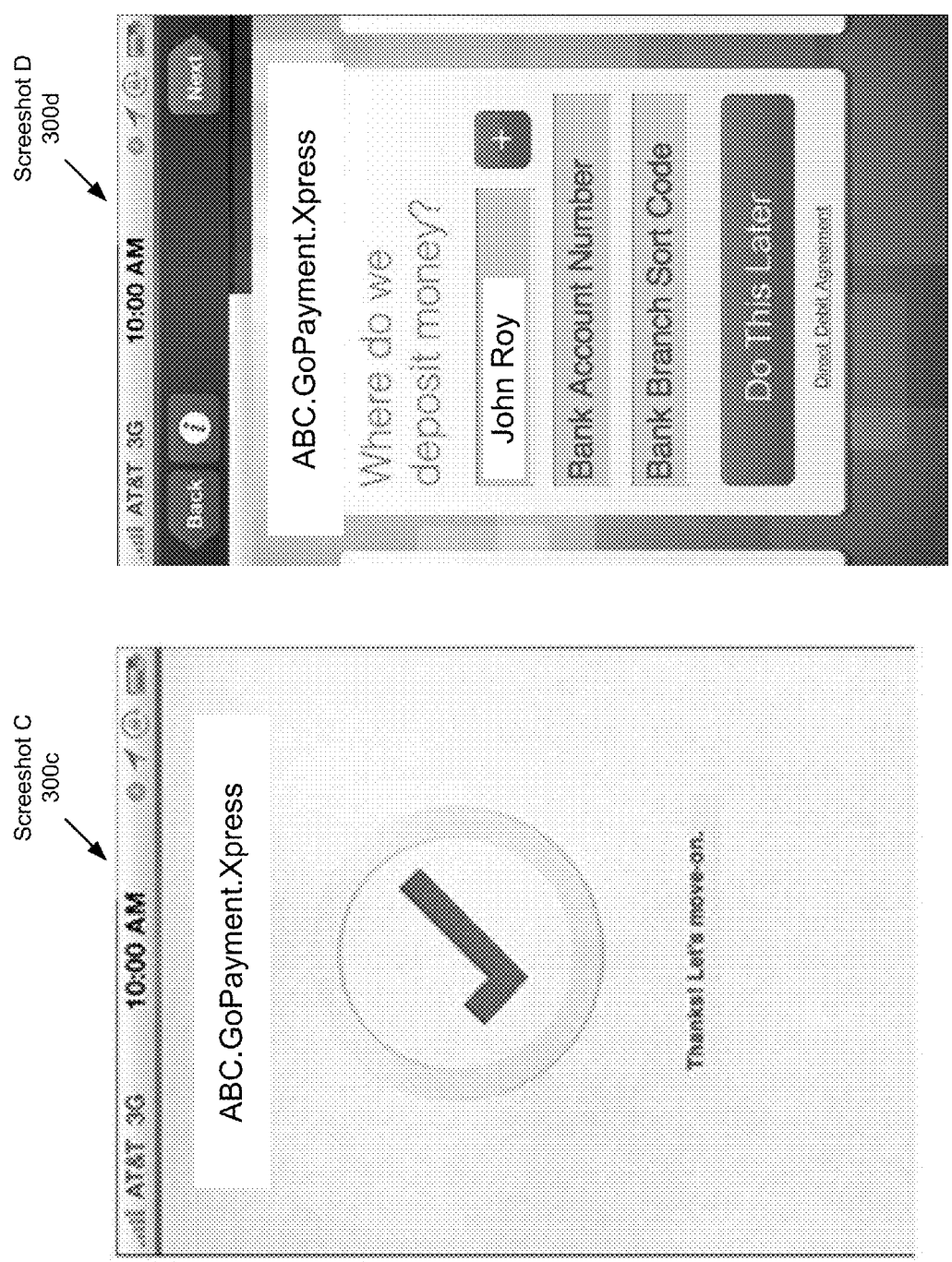

PRE-ALLOCATING MERCHANT ID IN A CREDIT CARD PROCESSOR ENTITY SYSTEM BY A MASTER MERCHANT

BACKGROUND

A merchant account is a type of bank account established under an agreement between an acceptor (i.e., a merchant accepting credit card payments) and a merchant acquiring bank for the settlement of credit card transactions. In some cases, a payment processor or independent sales organization (ISO) is also a party to the merchant agreement. Whether a merchant enters into a merchant agreement directly with an acquiring bank, or through an aggregator such as an ISO, the agreement binds the merchant to obey the operating regulations established by the credit card brands. On an average it takes a small business owner 30 days to set up a merchant account before they can start accepting credit card payments from their customers. This is mostly due to processing company policies and regulations.

Once the merchant account is set up and the merchant is ready to accept credit card payments. The cardholder presents the credit card as payment to the merchant and the merchant submits the transaction to the acquirer (acquiring bank). The acquirer verifies the credit card number, the transaction type and the amount with the issuer (i.e., card-issuing bank) and reserves that amount of the cardholder's credit limit for the merchant. An authorization will generate an authorization code, which the merchant stores with the transaction.

Authorized transactions are stored in "batches," which are sent to the acquirer. Batches are typically submitted once per day at the end of the business day. The acquirer sends the batch transactions through the credit card association, which debits the issuers for payment and credits the acquirer. Essentially, the issuer pays the acquirer for the transaction. Once the acquirer has been paid, the acquirer pays the merchant. The merchant receives the amount totaling the funds in the batch minus a fee. A chargeback is an event in which money in a merchant account is held due to a dispute relating to the transaction. Chargebacks are typically initiated by the cardholder claiming deficiencies in product or service received. In the event of a chargeback, the issuer returns the transaction to the acquirer for resolution. The acquirer then forwards the chargeback to the merchant, who must either accept the chargeback or contest it.

SUMMARY

In general, in one aspect, the invention relates to a method to process credit card transactions. The method includes obtaining, by a computer processor of a master merchant, a plurality of available merchant account IDs allocated to a master merchant account at a credit card processor entity of a credit card transaction network, wherein the master merchant is authorized to set up merchant accounts based on the master merchant account and assumes merchant-side financial risks of the merchant accounts, receiving, by the computer processor after obtaining the plurality of available merchant account IDs, a request from a merchant to set up a merchant account, and assigning, by the computer processor and in response to credit approval of the merchant, a merchant account ID selected from the plurality of available merchant account IDs to the merchant for setting up the merchant account, wherein a credit card transaction of the merchant is submitted, subsequent to assigning the merchant account ID, to the credit card processor entity for authorization based on the master merchant account, wherein the credit card transaction is tagged with the merchant account ID.

In general, in one aspect, the invention relates to a master merchant system to process credit card transactions. The master merchant system includes a processor and memory, an available merchant ID assigning module comprising instructions stored in the memory and executed by the processor to obtain a plurality of available merchant account IDs allocated to a master merchant account at a credit card processor entity of a credit card transaction network, wherein the master merchant is authorized to set up merchant accounts based on the master merchant account and assumes merchant-side financial risks of the merchant accounts, receive, after obtaining the plurality of available merchant account IDs, a request from a merchant to set up a merchant account, and assign, in response to credit approval of the merchant, a merchant account ID selected from the plurality of available merchant account IDs to the merchant for setting up the merchant account, wherein a credit card transaction of the merchant is submitted, subsequent to assigning the merchant account ID, to the credit card processor entity for authorization based on the master merchant account, wherein the credit card transaction is tagged with the merchant account ID.

In general, in one aspect, the invention relates to a non-transitory computer readable medium storing instructions to process credit card transactions. The instructions, when executed by a computer processor, includes functionality to obtain a plurality of available merchant account IDs allocated to a master merchant account at a credit card processor entity of a credit card transaction network, wherein the master merchant is authorized to set up merchant accounts based on the master merchant account and assumes merchant-side financial risks of the merchant accounts, receive, after obtaining the plurality of available merchant account IDs, a request from a merchant to set up a merchant account, and assign, in response to credit approval of the merchant, a merchant account ID selected from the plurality of available merchant account IDs to the merchant for setting up the merchant account, wherein a credit card transaction of the merchant is submitted, subsequent to assigning the merchant account ID, to the credit card processor entity for authorization based on the master merchant account, wherein the credit card transaction is tagged with the merchant account ID.

Other aspects of the invention will be apparent from the following detailed description and the appended claims.

BRIEF DESCRIPTION OF DRAWINGS

FIGS. 3A-3E show an example of pre-allocating merchant ID in a credit card processor entity system by a master merchant in accordance in accordance with one or more embodiments of the invention.

DETAILED DESCRIPTION

Figure 1:
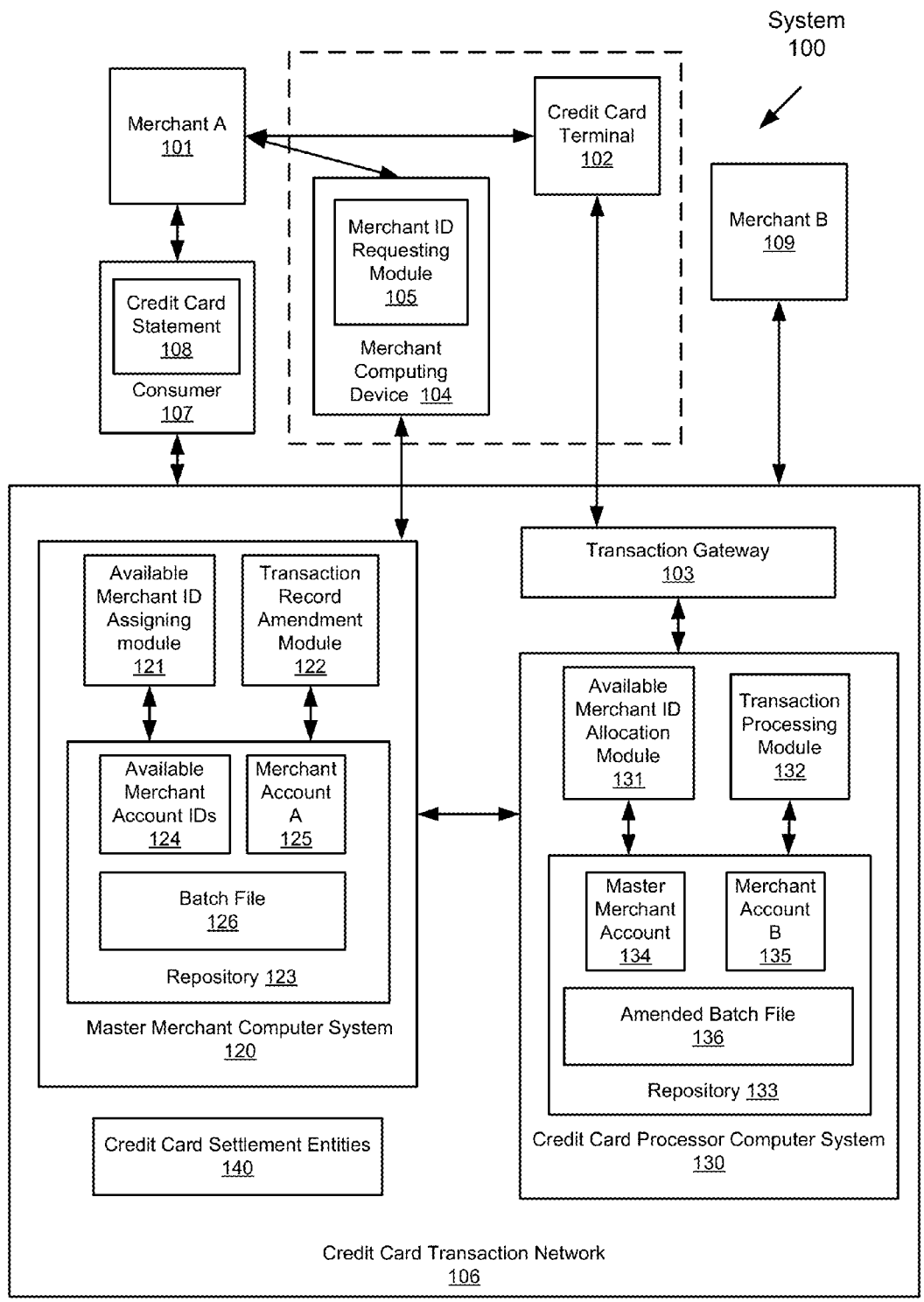
FIG. 1 shows a schematic diagram of a system of ordering pre-allocating merchant ID in a credit card processor entity system by a master merchant in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a check ordering system in accordance with embodiments disclosed herein.

As shown in FIG. 1, the system (100) includes merchant A (101), credit card terminal (102), merchant computing device (104) configured with merchant ID requesting module (105), consumer (107) receiving a credit card statement (108), credit card transaction network (106), and another merchant B (109). In addition, the credit card transaction network (106) includes master merchant computer system (120), credit card processor computer system (130), transaction gateway (103), and credit card settlement entities (140). Further, the master merchant computer system (120) includes available merchant ID assigning module (121), transaction record amendment module (122) and repository (123) storing available merchant account IDs (124), merchant account A (125), and batch file (126). The credit card processor computer system (130) includes available merchant ID allocation module (131), transaction processing module (132), and repository (133) storing master merchant account (134), merchant account B (135), and amended batch file (136). Various components of the credit card transaction network are coupled via a computer network (not shown). For example, the computer may include a wireless communication network (e.g., a mobile phone network) and wired and/or wireless portions of public and/or private data network, such as wide area networks (WANs), local area networks (LANs), Internet, etc.

The consumer (107) is a credit card holder who may be an individual using a personal credit card or a business entity using a business credit card. The merchant A (101) is an individual or a business entity that accepts credit card payments for products or services sold to a credit card holder, such as the consumer (107). In one or more embodiments, the merchant A (101) sets up the required merchant account via a master merchant by sending a request to the master merchant computer system (120). In one or more embodiments, the merchant A (101) uses the merchant computing device (104) to submit the merchant account set up request. For example, the merchant computing device (104) may be a desktop computer, a notebook computer, or other mobile computing device. Once the merchant account is set up, the merchant A (101) can accept a credit card payment from the consumer (107) by submitting the credit card transaction to the credit card transaction network (106) using the credit card terminal (102). For example, the credit card terminal (102) may be a stand alone device with a magnetic card swiper and/or a pin pad for entering credit card information. In one or more embodiments, the master merchant computer system (120) and the credit card terminal (102) may be integrated in a single device (e.g., a smartphone) of the merchant A (101). For example, the merchant ID requesting module (105) may be a software application installed on the smartphone. Similarly, functionality of the credit card terminal (102) may be provided by the same software application or another software application installed on the smartphone. In such case, the credit card information may be entered via the keypad on the smartphone or via a magnetic swiper coupled to the smartphone.

The credit card transaction of the merchant A (101) is submitted by the transaction gateway (103) to the credit card processor computer system (130) and settled through the credit card settlement entities (140). Generally, the credit card settlement entities (140) may include one or more of a card-issuing bank, an acquiring bank, an independent sales organization (ISO), a credit card association, etc. that collectively implements the mechanics of the electronic transactions. In particular, the card-issuing bank is the financial institution that issues the credit card to the cardholder, bills the consumer for repayment, and bears the risk that the card is used fraudulently. The acquiring bank is the financial institution accepting credit card payment for the products or services on behalf of the merchant. The ISO is a reseller of the services of the acquiring bank to merchants. The credit card association is an association of card-issuing banks that set transaction terms for merchants, card-issuing banks, and acquiring banks.

In one or more embodiments, the credit card processor computer system (130) may be operated directly by an acquiring bank, by an ISO reselling the service of the acquiring bank, or by another master merchant aggregating lower level master merchant accounts of other master merchants. As shown in FIG. 1, the merchant B (109) accepts credit card payment based on the merchant account B (135) that is set up on the credit card processor computer system (130). In contrast, the merchant A (101) accepts credit card payment based on the merchant account A (125) that is set up on the master merchant computer system (120). In particular, the merchant account A (125) is set up under the umbrella of the master merchant account (134) that is in turn set up on the credit card processor computer system (130). In one or more embodiments, the master merchant account (134) is used to aggregate multiple merchant accounts set up on the master merchant computer system (120). Specifically, the master merchant operating the master merchant computer system (120) approves merchant account set up requests from multiple merchants and bears merchant-side risks of these multiple merchants based on the master merchant account (134).

In one or more embodiments, the master merchant computer system (120) includes the available merchant ID assigning module (121) that is configured to obtain available merchant account IDs allocated to the master merchant account (134) on the credit card processor computer system (130) that is operated by a credit card processor entity of the credit card transaction network (106). For example, the available merchant account IDs (124) may be allocated by the available merchant ID allocation module (131) of the credit card processor computer system (130) and released to the master merchant computer system (120). As noted above, the master merchant is authorized to set up merchant accounts (e.g., merchant account A (125)) based on the master merchant account (134) and assumes merchant-side financial risks of the merchant accounts (e.g., merchant account A (125)). In one or more embodiments, the merchant account ID includes one or more of a merchant ID identifying a merchant of the merchant account (e.g., merchant account A (125)) and a terminal ID identifying a credit card terminal (e.g., credit card terminal (102)) associated with the merchant account. Throughout this disclosure, the terms "credit card processor computer system" and "credit card processor entity" operating the credit card processor computer system may be used interchangeably depending on the context. Further, the terms "master merchant computer system" and "master merchant" operating the mater merchant computer system may be used interchangeably depending on the context.

After obtaining the available merchant account IDs (124) and storing them in the repository (123), the available merchant ID assigning module (121) may receive a request from the merchant A (101) to set up a merchant account. In one or more embodiments, the request is generated by the merchant ID requesting module (105) and submitted by the merchant computing device (104). Once the request is received by the master merchant computer system (120), a credit approval process is initiated to evaluate credit worthiness of the merchant A (101). In particular, any dispute record from prior customers of the merchant A (101) may negatively influence the credit rating of the merchant A (101). Upon credit approval of the merchant A (101), the available merchant ID assigning module (121) selects a merchant account ID from the available merchant account IDs (124) and assigns the selected merchant account ID to the merchant A (101) for setting up the merchant account A (125).

Once the merchant account A (125) is set up, the merchant A (101) is ready to accept credit card payment from the consumer (107). In one or more embodiments, subsequent to assigning the merchant account ID, a credit card transaction of the merchant A (101) is submitted to the credit card processor computer system (130) for authorization based on the master merchant account (134). Because the merchant account A (125) is local to the master merchant computer system (120) and not registered with the credit card processor computer system (130), the credit card transaction from the merchant A (101) is processed by the transaction processing module (132) of the credit card processor computer system (130) based on the master merchant account (134) and is tagged with the merchant account ID of the merchant A (101) for tracking purposes. Generally, when the credit card transaction is settled and the consumer (107) receives the credit card statement (108), the entry for this particular credit card transaction is listed under the master merchant's name, possibly with a code corresponding to the merchant account ID of the merchant A (101). As a result, the consumer (107) may not readily recognize, from reading the credit card statement (108), which merchant he/she made the purchase with.

In one or more embodiments, the master merchant computer system (120) further includes the transaction record amendment module (122) that is configured to annotate the credit card transaction with the actual merchant's name, so that it can be included in the credit card statement (108). In one or more embodiments, the transaction record amendment module (122) receives a record of the aforementioned credit card transaction and identifies a name of the merchant A (101) based on the merchant account ID contained in the record of the credit card transaction. Accordingly, the transaction record amendment module (122) generates an amended record of the credit card transaction by at least adding the name of the merchant A (101) to the record of the credit card transaction and sending the amended record of the credit card transaction to the credit card processor computer system (130). From time to time, the transaction record amendment module (122) may also flag a questionable credit card transaction record and tag it with a disapproval remark to initiate a fraud investigation process in the credit card transaction network (106).

In one or more embodiments, the credit card transaction is first received from the merchant A (101) by the transaction gateway (103), which in turn submits the credit card transaction to the credit card processor computer system (130) for authorization. In one or more embodiments, the transaction gateway (103) aggregates (e.g., on daily basis) multiple records of the credit card transactions in a batch file and sends it to the master merchant computer system (120) for review process. In such embodiments, the transaction record amendment module (122) amends (e.g., nightly) the records of the credit card transactions in the batch file (e.g., batch file (126)) subsequent to authorization of the credit card transactions (e.g., conducted through the day before a daily cut off time). Accordingly, the amended record of the credit card transaction is sent to the credit card processor entity in an amended batch file (e.g., amended batch file (136)), which is further processed for settlement purposes during which the name of the merchant A (101) is passed to the credit card issuing bank and included in the credit card statement (108) for the consumer (107).

In one or more embodiments, the transaction record amendment module (122) annotates the credit card transaction in real time instead of in the batch file. In such embodiments, the record of the credit card transaction is received by the transaction record amendment module (122) from the transaction gateway (103) prior to, or concurrently with, authorization of the credit card transaction by the credit card processor computer system (130). For example, the amended record of the credit card transaction may be submitted along with the credit card transaction to the credit card processor computer system (130) for authorization.

Based on the business arrangements, the transaction gateway (103) may be operated by an independent third party, the master merchant, or the credit card processor entity.

Figure 2:
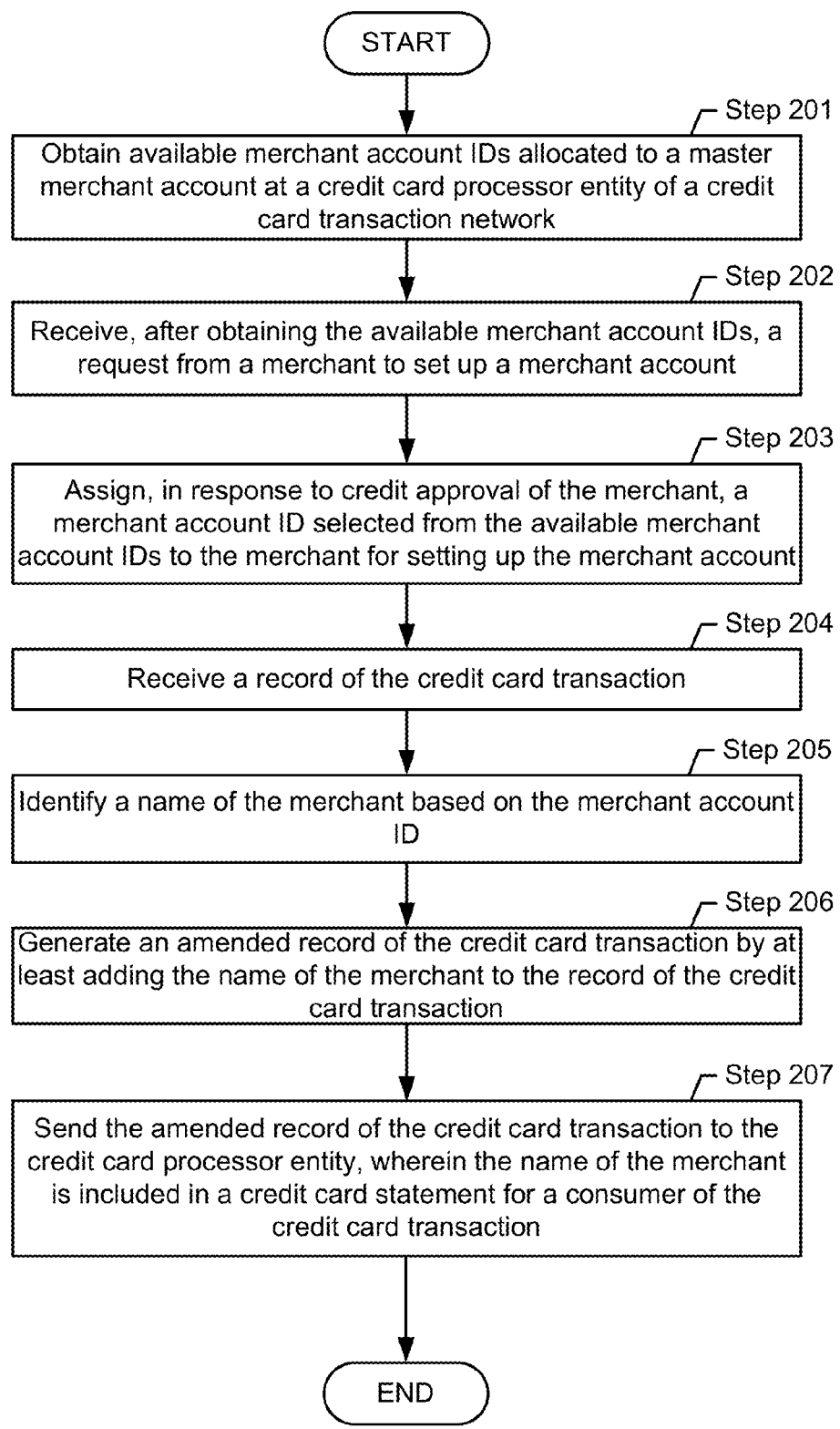
FIG. 2 shows a flowchart of a method of pre-allocating merchant ID in a credit card processor entity system by a master merchant in accordance in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100), in particular the master merchant computer system (120) described in reference to FIG. 1 above.

Traditionally, the merchant account is most likely set up at an independent sales organization (ISO) reselling service of an acquiring bank. As noted above, this process typically takes 30 days or more. In one or more embodiments, instead of being set up directly at the ISO in the traditional manner, the merchant account is aggregated among other merchant accounts under the umbrella of a master merchant account that is set up at the ISO. The method depicted in FIG. 2 allows the merchant to set up the merchant account expediently by going through the master merchant instead of seeking approval directly from the ISO or the acquiring bank.

Initially in Step 201, available merchant account IDs are obtained, which were pre-allocated to a master merchant account at a credit card processor entity of a credit card transaction network. As noted above, the master merchant is authorized to set up merchant accounts based on the master merchant account and assumes merchant-side financial risks of the merchant accounts. Based on business model and the discretion of the master merchant, the merchant account set up process can be expedited since the time consuming approval by the credit card processor entity are taken out of the loop. Traditionally, the credit card processor entity may be an ISO or the acquiring bank. In one or more embodiments, the credit card processor entity may also be another master merchant. In one or more embodiments, the available merchant account IDs are obtained by a master merchant computer system from a credit card processor computer system described in reference to FIG. 1 above.

In Step 202, after obtaining the available merchant account IDs, a request is received from a merchant to set up a merchant account. The request initiates a credit approval process to evaluate credit worthiness of the merchant. The merchant account set up request may be granted or denied based on this evaluation. In one or more embodiments, the merchant account set up request is received by the merchant computer system described in reference to FIG. 1 above. In particular, the available merchant account IDs are stored on this merchant computer system ready to be assigned upon request and approval.

In Step 203, in response to credit approval of the merchant, a merchant account is selected from the available merchant account IDs and assigned to the merchant for setting up the merchant account. In one or more embodiments, the merchant ID is assigned to the merchant by the merchant computer system described in reference to FIG. 1 above.

Once the merchant account is set up, the merchant is ready to accept credit card payment from the consumer. In one or more embodiments, subsequent to assigning the merchant account ID, a credit card transaction of the merchant is submitted for authorization based on the master merchant account. Because the merchant account is set up by the master merchant instead of the credit card processor entity, the credit card transaction from the merchant is processed in the credit card transaction network based on the master merchant account and is tagged with the merchant account ID of the merchant A for tracking purposes. Generally, when the credit card transaction is settled and the consumer receives the credit card statement, the entry for this particular credit card transaction is listed under the master merchant's name, possibly with a code corresponding to the merchant account ID of the merchant A. As a result, the consumer may not readily recognize, from reading the credit card statement, which merchant he/she made the purchase with.

In Step 204, a record of the credit card transaction is received, for example by the master merchant computer system described in reference to FIG. 1 above. In one or more embodiments, the record of the credit card transaction is received from a transaction gateway in a batch file, for example at end of each day after a daily cut off time. In one or more embodiments, the record of the credit card transaction is received from the transaction gateway in real time as the credit card transaction is being authorized.

In Step 205, a name of the merchant is identified, for example by the master merchant computer system described in reference to FIG. 1 above, based on the merchant account ID contained in the record of the credit card transaction. As noted above, this merchant name look up may be done for the batch file or done in real time as the credit card transaction is being authorized.

In Step 206, an amended record of the credit card transaction is generated, for example by the master merchant computer system described in reference to FIG. 1 above. In one or more embodiments, the amended record of the credit card transaction is generated by at least adding the name of the merchant to the record of the credit card transaction.

In Step 207, the amended record of the credit card transaction is sent to the credit card processor entity, for example by the master merchant computer system described in reference to FIG. 1 above. Once the credit card transaction is settled, the name of the merchant is included in a credit card statement for the consumer of the credit card transaction.

In one or more embodiments, the credit card transaction is sent from the merchant via a transaction gateway to the credit card processor entity for authorization. In one or more embodiments, the record of the credit card transaction is received in a batch file by the master merchant computer system from the transaction gateway subsequent to authorization of the credit card transaction. In such embodiments, the amended record of the credit card transaction is included in an amended batch file and sent to the credit card processor for use in the settlement.

In one or more embodiments, the record of the credit card transaction is received by the master merchant computer system from the transaction gateway in real time prior to authorization of the credit card transaction. In such embodiments, the amended record of the credit card transaction may be returned to the transaction processor and submitted along with the credit card transaction to the credit card processor entity during the authorization process.

FIGS. 3A-3E show an application example in accordance with one or more embodiments of the invention. This example application may be practiced using the system (100) of FIG. 1 and based on the method described with respect to FIG. 2 above.

The example depicted in FIGS. 3A-3E is related to a scenario of a cab driver John Roy waiting for a passenger Mary to pay the cab fare. Mary suddenly realizes that she does not have any cash in her purse and ask John if he accepts credit card payment. Although John is not yet set up for accepting credit card payment, he remembers a fellow cab driver Henry once told him how easy it was for him to get going with the master merchant "ABC.GoPayment." John uses his smartphone to search for "ABC.GoPayment" and quickly downloads a mobile application "ABC.GoPayment.Xpress" onto his smartphone. FIGS. 3A-3E show example screenshots of the mobile application on John's smartphone during the set up process of a merchant account for John on the spot so that Mary can pay her cab fare using her credit card.

Figure 3A:
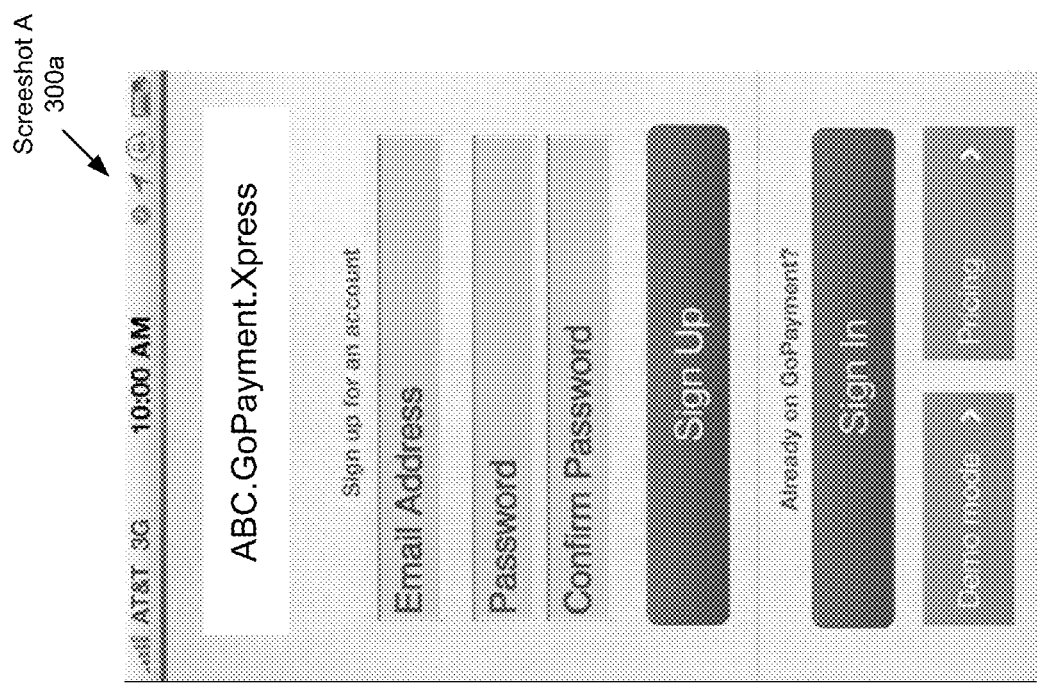

FIG. 3A shows a screenshot A (300a) displayed on John's smartphone that is a set up menu for the merchant account under the master merchant "ABC.GoPayment." In this set up menu, John is asked to input his email address and password. The same menu also allows John to login in the future after the merchant account is set up.

Figure 3B:
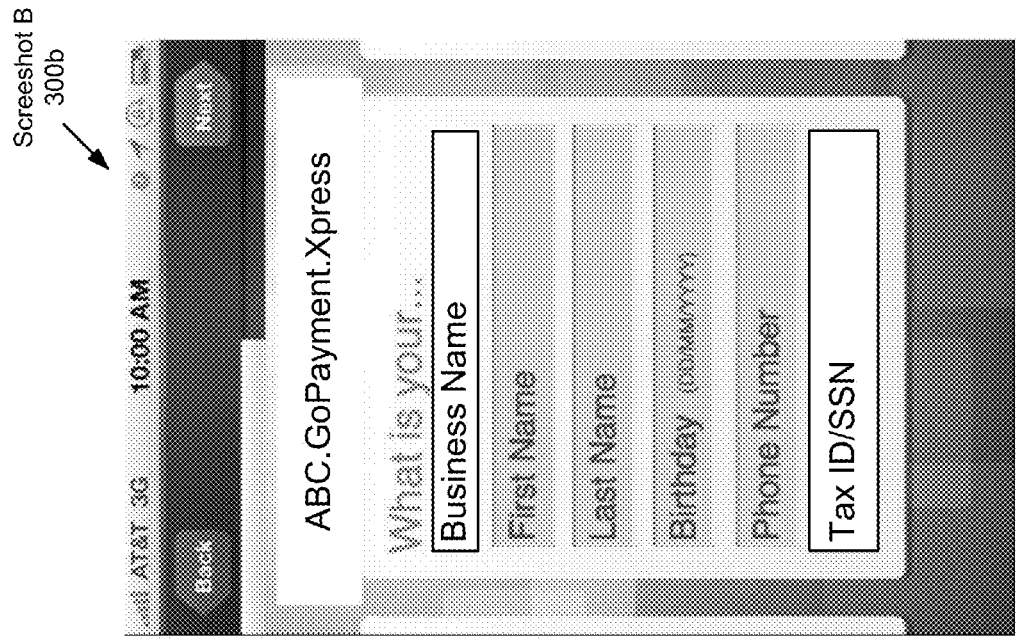

FIG. 3B shows a screenshot B (300b) on John's smartphone that is a continuation of the set up menu where John is asked to input additional information so that a credit approval process can be initiated to evaluate John's credit worthiness. John enters business name "John Roy's Cab Service," his name "John Roy", birthday "xx/xx/xxxx", phone number "xxx-xxx-xxxx", tax ID/social security number "xxx-xx-xxxx," etc. The master merchant "ABC.GoPayment" decides whether to take John on under the umbrella of its own master merchant account.

FIG. 3C shows a screenshot C (300c) on John's smartphone that is an account approval message letting John know that he can go ahead start accepting credit card payments using the mobile application "ABC.GoPayment.Xpress."

FIG. 3D shows a screenshot D (300d) on John's smartphone allowing him to specify his bank account information where the master merchant "ABC.GoPayment" will send collected credit card payment funds. John can complete this any time before or after the first credit card transaction using "ABC.GoPayment.Xpress."

Figure 3E:
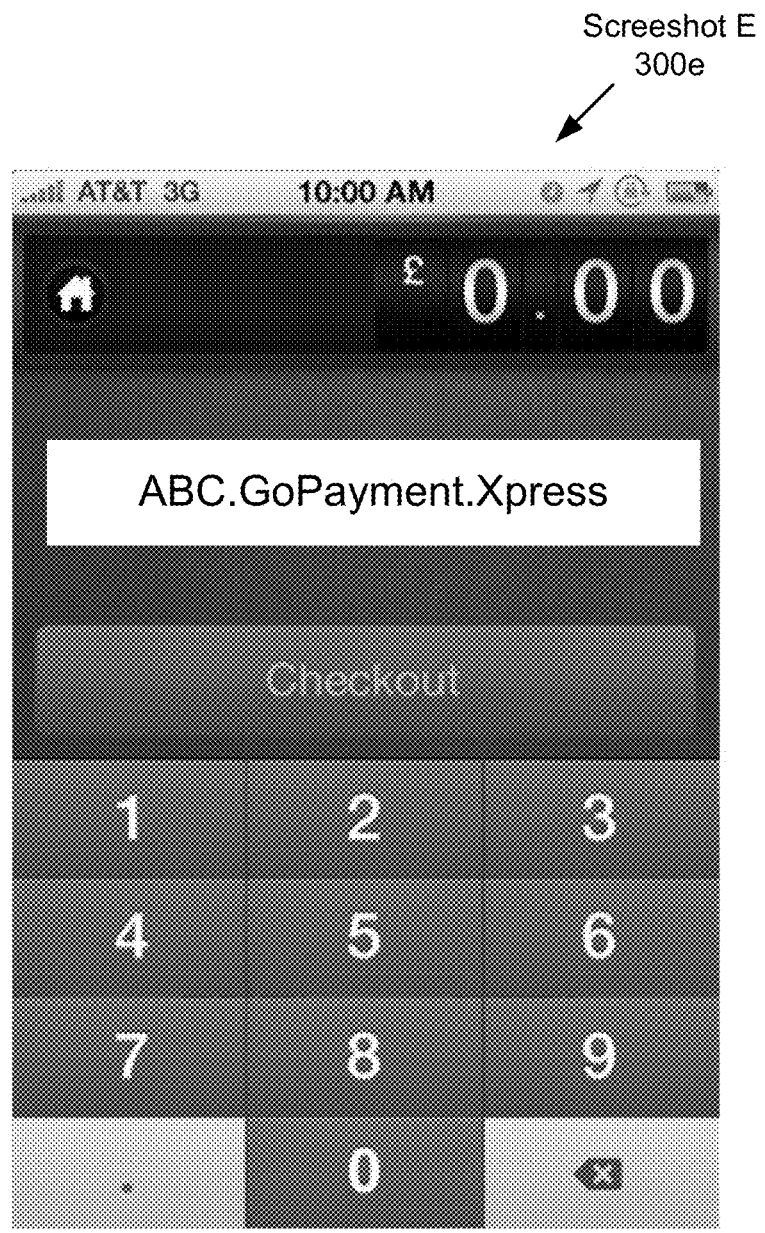

FIG. 3E shows a screenshot E (300e) on John's smartphone that is a credit card payment menu where John can key in the charge amount and credit card information (e.g., credit card number, expiration date, etc.) In no time, John enters $25 for Mary's fare plus $5 tip that Mary offers. The charge goes through and the entire process is completed in 15 minutes. Three days later, John also receives a stand alone credit card terminal with a magnetic card swiper and a keypad so that he can have a choice to either swipe customer's credit card or manually enter the credit card number when accepting credit card payment from a customer. A month later, Mary receives her credit card statement showing a $30 charge labeled as "ABC.GoPayment for John Roy's Cab Service."

Figure 4:
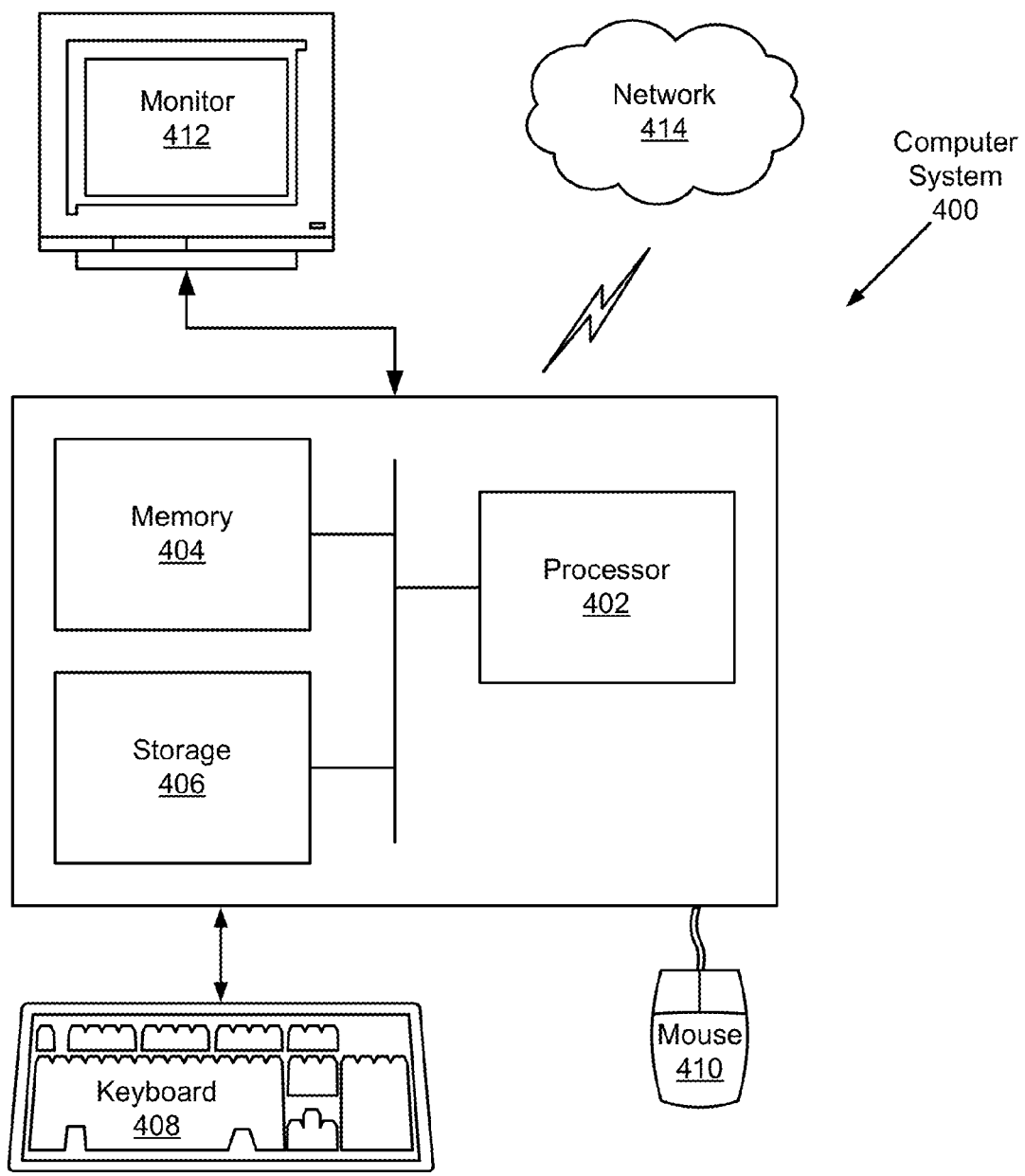
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection. Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to process credit card transactions, comprising:

obtaining, by the master merchant computer system from a credit card processor computer system of a credit card transaction network, a plurality of available merchant account IDs;

transmitting, by a master merchant computer system separate from the credit card processor computer system, a merchant account set up application to a computer system of a merchant of a plurality of merchants;

receiving, by the master merchant computer system and after obtaining the plurality of available merchant account IDs and providing the merchant account set up application, a request from the computer system of the merchant via the merchant account set up application to set up a merchant account of the plurality of merchant accounts, wherein the request comprises a name of the merchant;

receiving, by the master merchant computer system from a credit card processor computer system, a credit approval of the merchant;

assigning, by the master merchant computer system and in response to the credit approval of the merchant and the request, a merchant account ID selected from the plurality of available merchant account IDs to the merchant for setting up the merchant account;

receiving, by the master merchant computer system from the credit card processor computer system, a record of a credit card transaction of the merchant, wherein the credit card transaction includes the merchant account ID;

identifying, by the master merchant computer system, the name of the merchant based on the merchant account ID included in the record of the credit card transaction;

generating, by the master merchant computer system, an amended record of the credit card transaction by at least adding the name of the merchant to the record of the credit card transaction; and sending, by the master merchant computer system, the amended record of the credit card transaction to the credit card processor computer system.

2. The method of claim 1, wherein the merchant account ID comprises at least one selected from a group consisting of a merchant ID and a terminal ID.

3. The method of claim 1, wherein the credit card processor computer system is operated by at least one selected from a group consisting of an acquiring bank of the credit card transaction network, an independent sales organization of the credit card transaction network, and another master merchant of the credit card transaction network.

4. The method of claim 1, further comprising: receiving, by a transaction gateway in the credit card transaction network, the credit card transaction from the merchant, wherein the credit card transaction is submitted by the transaction gateway to the credit card processor computer system for authorization.

5. The method of claim 4, wherein the record of the credit card transaction is received in a batch file by the master merchant computer system from the transaction gateway subsequent to authorization of the credit card transaction, and wherein the amended record of the credit card transaction is sent to the credit card processor computer system in an amended batch file.

6. The method of claim 4, wherein the record of the credit card transaction is received by the master merchant computer system from the transaction gateway prior to authorization of the credit card transaction, and wherein submitting the credit card transaction to the credit card processor computer system for authorization comprises sending the amended record of the credit card transaction to the credit card processor computer system.

7. A master merchant system to process credit card transactions, comprising:
  a processor and memory;
  an available merchant ID assigning module comprising instructions stored in the memory and executed by the processor to perform the steps of:
  obtaining, by the master merchant computer system from a credit card processor computer system of a credit card transaction network, a plurality of available merchant account IDs;
  transmitting, by a master merchant computer system separate from the credit card processor computer system, a merchant account set up application to a computer system of a merchant of a plurality of merchants;
  receiving, by the master merchant computer system and after obtaining the plurality of available merchant account IDs and providing the merchant account set up application, a request from the computer system of the merchant via the merchant account set up application to set up a merchant account of the plurality of merchant accounts, wherein the request comprises a name of the merchant;
  receiving, by the master merchant computer system from a credit card processor computer system, a credit approval of the merchant;
  assigning, by the master merchant computer system and in response to the credit approval of the merchant and the request, a merchant account ID selected from the plurality of available merchant account IDs to the merchant for setting up the merchant account; and
  a transaction record amendment module comprising instructions stored in the memory and executed by the processor to perform the steps of:
  receiving, by the master merchant computer system from the credit card processor computer system, a record of a credit card transaction of the merchant, wherein the credit card transaction includes the merchant account ID;
  identifying, by the master merchant computer system, the name of the merchant based on the merchant account ID included in the record of the credit card transaction;
  generating, by the master merchant computer system, an amended record of the credit card transaction by at least adding the name of the merchant to the record of the credit card transaction; and
  sending, by the master merchant computer system, the amended record of the credit card transaction to the credit card processor computer system.

8. The master merchant system of claim 7, wherein the merchant account ID comprises at least one selected from a group consisting of a merchant ID and a terminal ID.

9. The master merchant system of claim 7, wherein the credit card processor computer system is operated by at least one selected from a group consisting of an acquiring bank of the credit card transactions, an independent sales organization of the credit card transactions, and another master merchant.

10. The master merchant system of claim 7, wherein the credit card transaction is received from the merchant by a transaction gateway in the credit card transaction network, and wherein the credit card transaction is submitted by the transaction gateway to the credit card processor computer system entity for authorization.

11. The master merchant system of claim 10, wherein the record of the credit card transaction is received in a batch file by the transaction record amendment module from the transaction gateway subsequent to authorization of the credit card transaction, and wherein the amended record of the credit card transaction is sent to the credit card processor computer system entity in an amended batch file.

12. The master merchant system of claim 10, wherein the record of the credit card transaction is received by the transaction record amendment module from the transaction gateway prior to authorization of the credit card transaction, and wherein submitting the credit card transaction to the credit card processor computer system for authorization comprises sending the amended record of the credit card transaction to the credit card processor computer system.

13. The master merchant system of claim 10, wherein the transaction gateway is part of the credit card processor computer system.

14. A non-transitory computer readable medium storing instructions to process credit card transactions, wherein the instructions, when executed by a computer processor, perform the method steps of:
  obtaining, by the master merchant computer system from a credit card processor computer system of a credit card transaction network, a plurality of available merchant account IDs;
  transmitting, by a master merchant computer system separate from the credit card processor computer system, a merchant account set up application to a computer system of a merchant of a plurality of merchants;
  receiving, by the master merchant computer system and after obtaining the plurality of available merchant account IDs and providing the merchant account set up application, a request from the computer system of the merchant via the merchant account set up application to set up a merchant account of the plurality of merchant accounts, wherein the request comprises a name of the merchant;
  receiving, by the master merchant computer system from a credit card processor computer system, a credit approval of the merchant;
  assigning, by the master merchant computer system and in response to the credit approval of the merchant and the request, a merchant account ID selected from the plurality of available merchant account IDs to the merchant for setting up the merchant account;
  receiving, by the master merchant computer system from the credit card processor computer system, a record of a credit card transaction of the merchant, wherein the credit card transaction includes the merchant account ID;
  identifying, by the master merchant computer system, the name of the merchant based on the merchant account ID included in the record of the credit card transaction;
  generating, by the master merchant computer system, an amended record of the credit card transaction by at least adding the name of the merchant to the record of the credit card transaction; and
  sending, by the master merchant computer system, the amended record of the credit card transaction to the credit card processor computer system.

15. The non-transitory computer readable medium of claim 14, wherein the merchant account ID comprises at least one selected from a group consisting of a merchant ID and a terminal ID.

16. The non-transitory computer readable medium of claim 14, wherein the credit card processor computer system is operated by at least one selected from a group consisting of an acquiring bank of the credit card transaction network, an independent sales organization of the credit card transaction network, and another master merchant of the credit card transaction network.

17. The non-transitory computer readable medium of claim 14, wherein the credit card transaction is submitted by a transaction gateway in the credit card transaction network to the credit card processor computer system for authorization.

18. The non-transitory computer readable medium of claim 17, wherein the record of the credit card transaction is received in a batch file from the transaction gateway subsequent to authorization of the credit card transaction, and wherein the amended record of the credit card transaction is sent to the credit card processor computer system in an amended batch file.

19. The non-transitory computer readable medium of claim 17, wherein the record of the credit card transaction is received from the transaction gateway prior to authorization of the credit card transaction, and wherein submitting the credit card transaction to the credit card processor computer system for authorization comprises sending the amended record of the credit card transaction to the credit card processor computer system.

* * * * *